US011365067B2

(12) United States Patent
Meunier et al.

(10) Patent No.: US 11,365,067 B2
(45) Date of Patent: Jun. 21, 2022

(54) DEVICE FOR TRANSFERRING HOLLOW BODIES, EQUIPPED WITH A CLEANING TOOL

(71) Applicant: SIDEL PARTICIPATIONS, Octeville-sur-Mer (FR)

(72) Inventors: Eric Meunier, Octeville-sur-Mer (FR); Pascal Bertin, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/259,464

(22) PCT Filed: Jul. 4, 2019

(86) PCT No.: PCT/FR2019/051655
§ 371 (c)(1),
(2) Date: Jan. 11, 2021

(87) PCT Pub. No.: WO2020/012095
PCT Pub. Date: Jan. 16, 2020

(65) Prior Publication Data
US 2021/0261357 A1    Aug. 26, 2021

(30) Foreign Application Priority Data
Jul. 11, 2018 (FR) ...................................... 1856361

(51) Int. Cl.
*B65G 47/86* (2006.01)
*B08B 1/00* (2006.01)
(Continued)

(52) U.S. Cl.
CPC ............ *B65G 47/847* (2013.01); *B08B 1/005* (2013.01); *B65G 45/14* (2013.01); *B65G 45/16* (2013.01); *B29C 49/4205* (2013.01)

(58) Field of Classification Search
CPC ....... B29C 49/42; B29C 49/4205; B08B 1/02; B08B 1/00; B65G 47/84; B65G 47/847; B65G 45/14; B65G 45/16
(Continued)

(56) References Cited
U.S. PATENT DOCUMENTS 3,540,572 A * 11/1970 McCall ................... E21B 12/06
198/498
3,601,954 A * 8/1971 Aronson ................. A61J 3/074
198/803.14
(Continued)

FOREIGN PATENT DOCUMENTS

DE        202007006 U1    9/2008
DE      102012221804 A1    5/2014
DE    10 2017 115 344 A1 *  1/2019 ............. B65B 35/26

OTHER PUBLICATIONS

International search report dated Sep. 27, 2019.

*Primary Examiner* — James R Bidwell

(57) ABSTRACT

The invention relates to a transfer device for a hollow article comprising a conveyor wheel, transfer arms mounted moveably on the conveyor wheel, and at least one static cam. The at least one static cam comprising at least one cam path that cooperates with cam followers carried by the transfer arms to control the position thereof. The wheel carries at least one cleaning tool for a related cam path, and the cleaning tool is mounted movably and pressed against the cam path with sufficient force to enable the automatic cleaning of the cam path as the conveyor wheel rotates.

20 Claims, 2 Drawing Sheets

Figure 1:
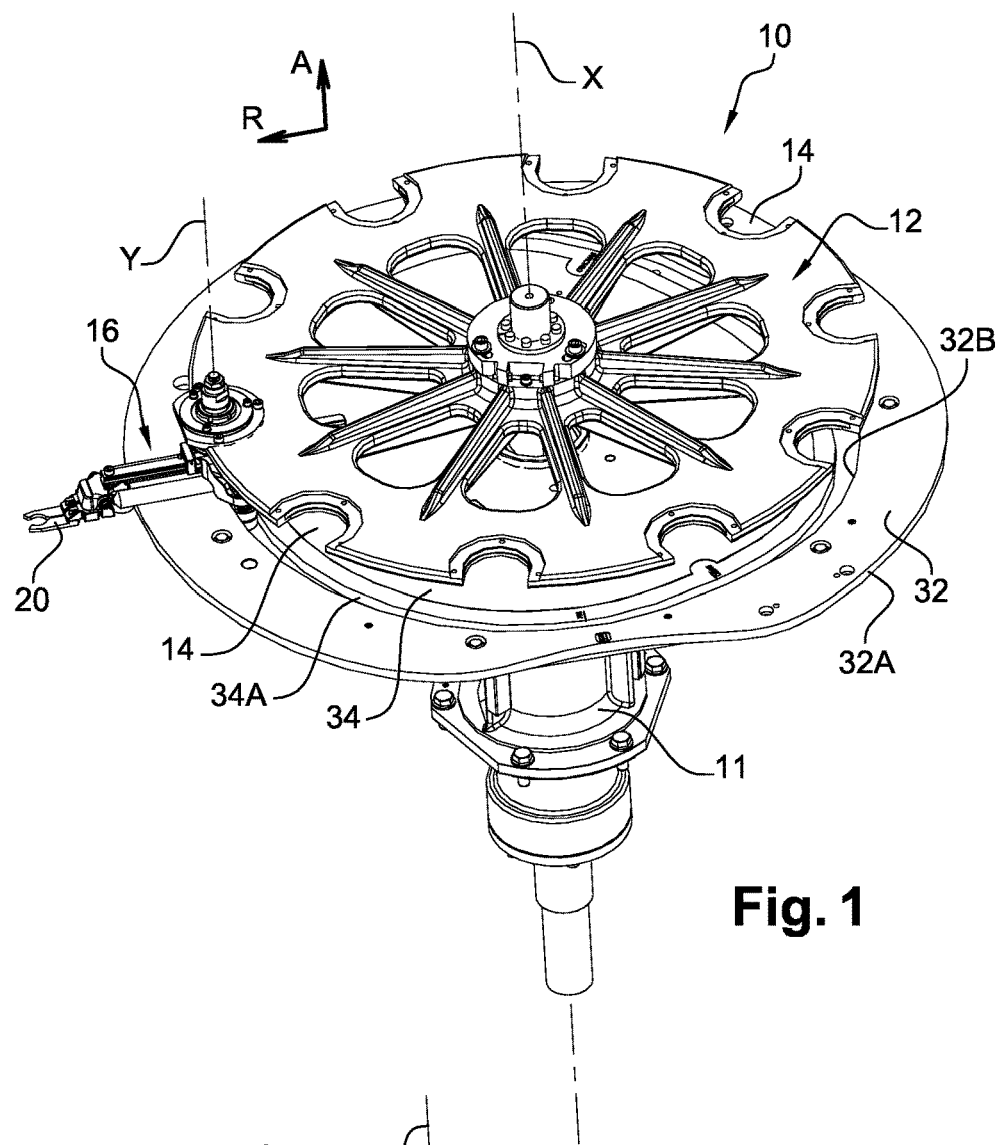

(51) Int. Cl.
*B65G 45/14* (2006.01)
*B65G 45/16* (2006.01)
*B29C 49/42* (2006.01)

(58) Field of Classification Search
USPC .................................. 198/498, 478.1–483.1
See application file for complete search history.

(56) References Cited

U.S. PATENT DOCUMENTS

| | | | | |
|---|---|---|---|---|
| 5,699,893 | A | * 12/1997 | Spada | B65B 19/226 |
| | | | | 198/478.1 |
| 8,813,950 | B2 | * 8/2014 | Papsdorf | B65G 47/846 |
| | | | | 198/474.1 |
| 2014/0318079 | A1 | * 10/2014 | Gruson | B67C 7/0053 |
| | | | | 53/266.1 |
| 2015/0069271 | A1 | * 3/2015 | Soellner | A61L 2/24 |
| | | | | 250/492.3 |

* cited by examiner

DEVICE FOR TRANSFERRING HOLLOW BODIES, EQUIPPED WITH A CLEANING TOOL

TECHNICAL FIELD OF THE INVENTION

The invention relates to a transfer device for a hollow article comprising:
- a conveyor wheel mounted in rotation about a central axis,
- transfer arms that are mounted moveably on the conveyor wheel and that are fitted with a gripping member for a hollow article,
- at least one static cam comprising at least one cam path that cooperates with cam followers carried by the transfer arms to control the position thereof.

TECHNICAL BACKGROUND TO THE INVENTION

The manufacture of recipients from thermoplastic material, such as bottles, is carried out using preforms that are heat conditioned then molded by blowing or stretch-blowing.

In the description below, the term "hollow article" may be used to refer both to the preforms and the final recipients.

Installations for the mass production of recipients made of thermoplastic material therefore have at least one heat conditioning station formed by a heating tunnel through which the preforms pass, and at least one blowing or stretch-blowing station that is fitted with molds designed to receive the line of heat conditioned preforms.

The preforms are also conveyed from one station to the other using conveyance means. For example, it is known to arrange the stations close to one another and to convey the preforms from one station to the other using conveyor wheels fitted with gripping means.

The gripping means are usually controlled by cam followers cooperating with cams.

During operation of the conveyance device, the cam paths are gradually clogged with a mixture of grease and polluting particles, such as plastic particles and/or metal particles.

The cam paths need to be cleaned regularly to prevent the layer of grime from damaging the rollers. Furthermore, the presence of this layer of grime is liable to cause abrupt variations in the speed and position of the gripping means.

Furthermore, cleaning must be carried out somewhat frequently to prevent the layer of grime from becoming encrusted and therefore too difficult to clean away.

It is currently known to clean the cam paths manually. Such weekly cleaning can stop the conveyance device for approximately one hour.

Furthermore, limited accessibility to certain portions of the cam prevents optimum cleaning.

Finally, this maintenance operation is potentially dangerous for human operators.

Furthermore, in a filling machine, notably an aseptic filling machine, it is known to use cleaning devices on the transfer wheels.

Document DE102012221804 describes a transfer device for recipients or preforms including a conveyor wheel mounted in rotation about an axis, and transfer arms that are mounted moveably on the conveyor wheel and that are fitted with a gripping member to pick a recipient or a preform. The mobility of the transfer arm is controlled by a device using a cam and rollers. In this invention, the transfer wheel has a cleaning device at the cam. This cleaning device has holes through which the cleaning product passes.

Furthermore, document DE202007006128 describes a carriage mounted on a door and/or a window sliding on a rail. This carriage has at least one roller and a scraper that come into contact with at least one rolling surface of the rail. The scraper helps to clean the rolling surface as the carriage moves.

SHORT SUMMARY OF THE INVENTION

Firstly, the invention proposes a transfer device for a hollow article comprising:
- a conveyor wheel mounted in rotation about a central axis,
- transfer arms that are mounted moveably on the conveyor wheel and that are fitted with a gripping member for a hollow article,
- at least one static cam comprising at least one cam path that cooperates with cam followers carried by the transfer arms to control the position thereof, characterized in that the conveyor wheel carries at least one cleaning tool for a related cam path, the cleaning tool being mounted movably and pressed against the cam path with sufficient force to enable the automatic cleaning of the cam path as the conveyor wheel rotates.

According to other features of the invention:
- each cleaning tool is carried by a slide fastened to the conveyor wheel that enables the cleaning tool to slide globally radially in relation to the conveyor wheel,
- the cleaning tool is pressed against the cam path by means of an elastic return member pressing against the cam path,
- the slide is mounted on a dedicated seat on the conveyor wheel between two adjacent transfer arms,
- the slide is fastened removably in place of a transfer arm,
- the cleaning tool is carried by an arm,
- the device has several cleaning tools carried by a single slide,
- each cleaning tool is carried removably by the slide, thereby enabling the cleaning tool to be replaced as required,
- the cleaning tool includes a scraper blade, notably a rubber blade or a steel blade or a ceramic blade,
- the cleaning tool includes a sponge that can be soaked in a cleaning product.

Secondly, the invention proposes a transfer device for a hollow article comprising:
- a conveyor wheel mounted in rotation about a central axis (X),
- transfer arms that are mounted moveably on the conveyor wheel and that are fitted with a gripping member for a hollow article,
- at least one static cam comprising at least one cam path that cooperates with cam followers carried by the transfer arms to control the position thereof, characterized in that the conveyor wheel carries at least one cleaning tool for a related cam path, the cleaning tool being mounted movably and pressed against the cam path with sufficient force to enable the automatic cleaning of the cam path as the conveyor wheel rotates and in that the cleaning tool is carried by a slide fastened to the conveyor wheel that enables the cleaning tool to slide globally radially in relation to the conveyor wheel.

According to other features of the invention:
- the cleaning tool is pressed against the cam path by means of an elastic return member pressing against the cam path,
- the slide is mounted on a dedicated seat on the conveyor wheel between two adjacent transfer arms, the slide is fastened removably in place of a transfer arm,
the cleaning tool is carried by an arm,
the device has several cleaning tools carried by a single slide,
each cleaning tool is carried removably on the slide, thereby enabling the cleaning tool to be replaced as required,
the cleaning tool includes a scraper blade, notably a rubber blade or a steel blade or a ceramic blade,
the cleaning tool includes a sponge that can be soaked in a cleaning product.

SHORT DESCRIPTION OF THE FIGURES

Figure 2:
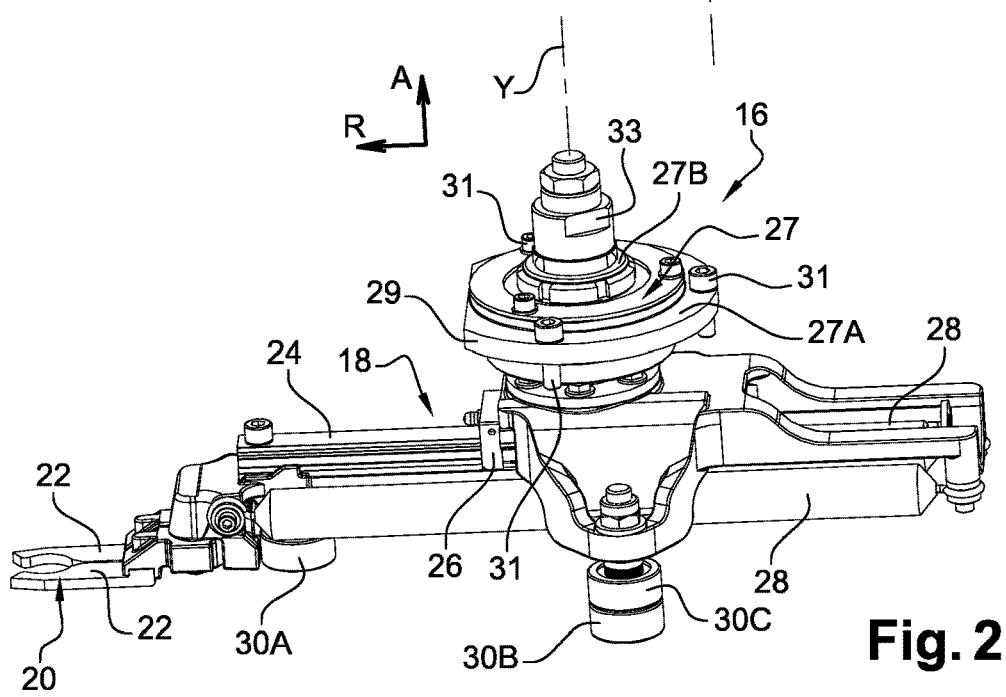
Figure 3:
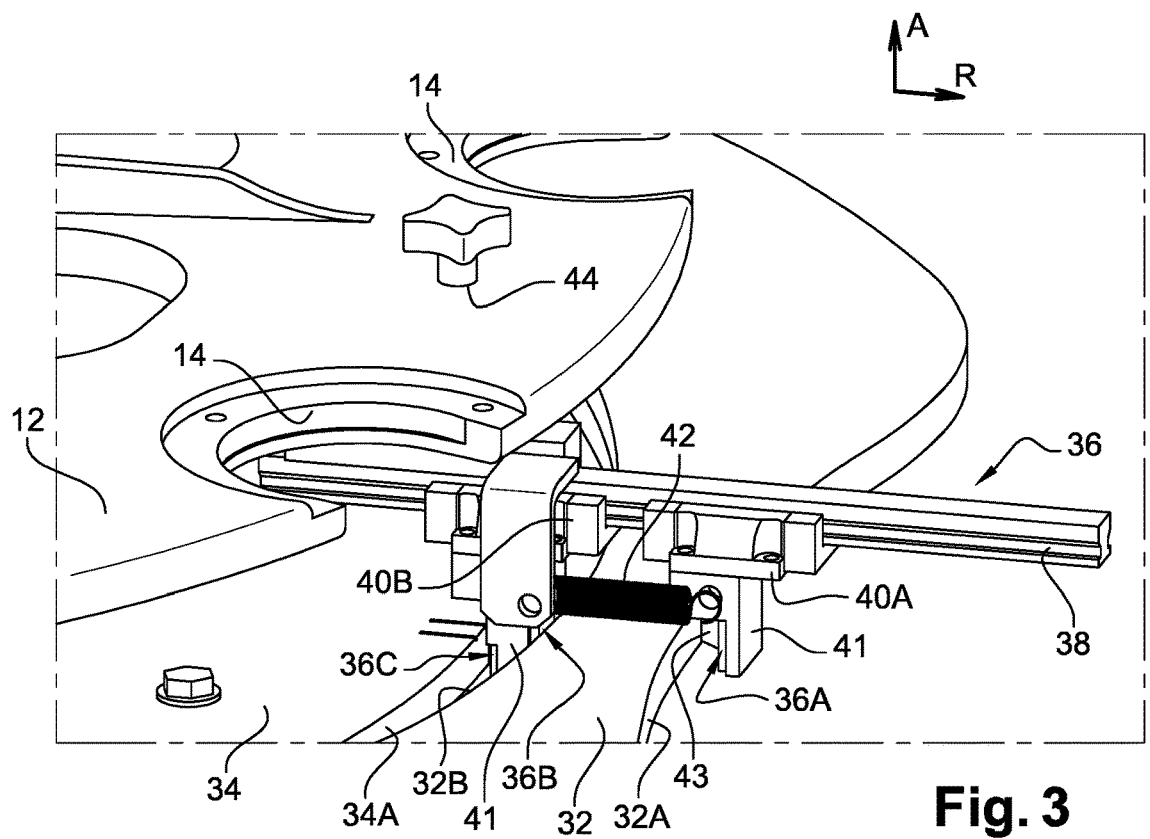
Figure 4:
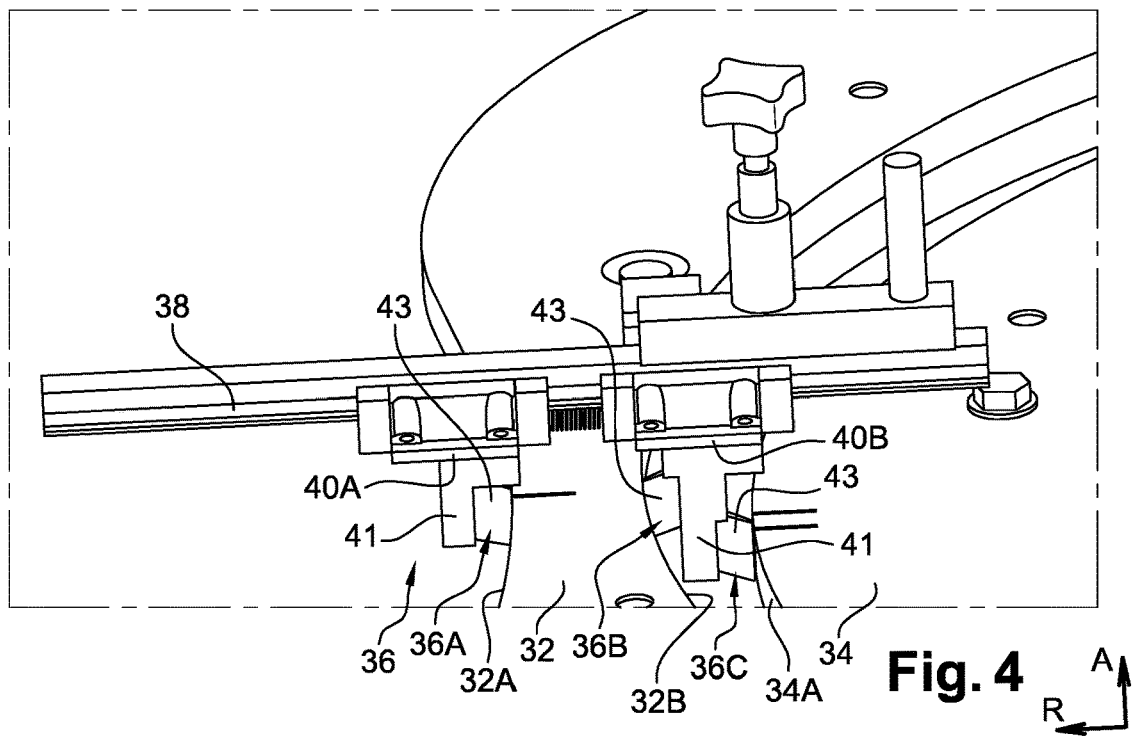

Other features and advantages of the invention are given in the detailed description provided below with reference to the attached drawings, in which:

FIG. 1 is a perspective view showing a transfer device including a conveyor wheel fitted with a transfer arm, FIG. 2 is a perspective view of the transfer arm fitted to the transfer device in FIG. 1, FIG. 3 is a larger-scale perspective view of the transfer device in FIG. 1 fitted with cleaning tools made according to the teachings of the invention, FIG. 4 is a view similar to the view in FIG. 3 from an opposing angle, in which the conveyor wheel is not shown, thereby enabling the cleaning tools pressed against the related cam paths to be seen.

DETAILED DESCRIPTION OF THE FIGURES

In the remainder of the description, elements that have the same, analogous or similar function are referred to using the same reference numbers.

The following non-limiting orientations are used in the remainder of the description:
axial "A", parallel to the rotation axis of the conveyor wheel, and
radial "R", extending perpendicular from the rotation axis of the conveyor wheel.

FIG. 1 shows a transfer device 10 for a hollow article (not shown) made of thermoplastic material. This transfer device 10 is fitted to an installation for mass producing recipients made of thermoplastic material, notably polyethylene terephthalate (PET). In such an installation, the final recipients are formed by blowing a preform made of thermoplastic material.

Such an installation conventionally comprises a heat conditioning kiln (not shown) through which the preforms pass, feed means (not shown) for feeding the kiln with preforms, a blowing or stretch-blowing station (not shown) for the preforms thus heat conditioned, and the transfer device 10 for transferring the heat conditioned preforms to the blowing station.

The transfer device 10 shown in FIG. 1 is in this case arranged to convey the preforms from the conditioning kiln to the blowing station.

According to a variant not shown, the transfer device can naturally be arranged in other places in the installation for the production of recipients.

The transfer device 10 in this case comprises a static base 11 bearing a horizontal conveyor wheel 12 that is rotary about an axially oriented rotation axis "X". Notches 14 are distributed regularly about the periphery of the conveyor wheel 12.

Each notch 14 forms a seat in which a gripping means 16 for gripping a preform is fastened. In the example shown in FIG. 1, a single gripping means 16 is shown for the sake of clarity.

As shown in greater detail in FIG. 2, each gripping means 16 comprises more specifically an orientable radial transfer arm 18. The arm 18 is mounted pivotingly about a vertical axis "Y" on the periphery of the conveyor wheel 12.

A free outer end of the arm 18 is fitted with a gripping member 20 for the hollow article, in this case a clamp for picking a preform via the neck thereof.

As shown in greater detail in FIG. 2, the clamp 20 comprises two jaws 22 that are mounted pivotingly about two axially oriented axes between an open position enabling a preform neck to be received and a closed position in which the neck of the preform is clamped. The clamp 20 is returned elastically to the closed position thereof by means of a spring (not shown).

In a variant of the invention not shown, just one of the jaws of the clamp is mounted rotatably about an axis.

According to another variant of the invention not shown, the two jaws are mounted rotatably about a common axis.

The clamp 20 is in this case able to slide along the radial axis of the arm 18 between a retracted position radially towards the inside and an extended position radially towards the outside. For this purpose, the clamp 20 is mounted on a sliding rail 24 received slidingly and radially in a pivoting guide 26.

The pivoting guide 26 is mounted pivotingly about the axis "Y" on the conveyor wheel 12, as shown in FIG. 1, by means of a roller bearing 27, the static portion 27A of which is fastened to the conveyor wheel 12 and the pivoting portion 27B of which carries the pivoting guide 26 by means of a swivel pin 33. The static portion 27A has a flange 29 that rests on the perimeter of the related notch 14 and is fastened to the conveyor wheel 12, for example by means of a screw 31.

The roller bearing 27 is arranged above the conveyor wheel 12, while the pivoting guide 26 and the sliding rail 24 are positioned beneath the conveyor wheel 12, the swivel pin 33 passing through the notch 14.

The clamp 20 is returned to the retracted position thereof by two return springs 28 arranged in parallel. A first outer end of each spring 28 is attached to the clamp 20 while a second inner end of each spring 28 is attached to the pivoting guide 26.

The gripping means 16 can then be moved by rotation of the conveyor wheel 12 along a circular path about the axis "X".

To enable the clamp 20 of each gripping means 16 to pick or release a preform in synchrony with the upstream and downstream conveyance means, means for controlling the longitudinal position of the arm 18 and for controlling the pivoting of the arm 18 about the axis "B" thereof are provided. These controlled means notably enable the gap between two preforms to be modified between entering and leaving the transfer device 10.

To do so, the gripping means 16 includes at least one cam follower. As shown in FIG. 2, the gripping means 16 are in this case fitted with a first cam follower 30A, a second cam follower 30B and a third cam follower 30C.

The first cam follower 30A is in this case carried by an outer end section of the sliding rail 24. The first cam follower 30A is more specifically arranged close to the clamp 20.

The second cam follower 30B is in this case carried by the pivoting guide 26, slightly off-centered from the pivot axis "Y" of the arm. The third cam follower 30C is mounted coaxially with the second cam follower 30B, just above the second cam follower 30B. The second cam follower 30B and the third cam follower 30C are thus superposed.

Each cam follower 30A, 30B, 30C is formed by a roller rolling about an axially oriented axis. The first and third cam followers 30A, 30C are in this case arranged vertically at the same height.

The first and third cam followers 30A, 30C are designed to cooperate with at least a first static cam 32 for controlling the gripping means 16. The first cam 32 is arranged along at least one section of the path of the gripping means 16.

As shown in FIG. 1, the first cam 32 is in this case formed by a ring that extends beneath the conveyor wheel 12 and about the entire circular path of the gripping means 16. The first cam 32 is fastened to the base 11, which is in turn fastened to the chassis.

The first cam 32 is made of a robust material, for example a metal such as steel.

The first cam 32 in this case has a first cam path 32A and a second cam path 32B that are respectively designed to cooperate with the first cam follower 30A and with the second cam follower 30B. The first cam path 32A, referred to as the outer cam path 32A, is formed by the outer vertical edge of the first cam 32, while the second cam path 32B, referred to as the inner cam path 32B, is formed by the inner vertical edge of the first cam 32.

The shape of the cam paths 32A, 32B thus makes it possible to simultaneously control the longitudinal position of the clamp 20 in relation to the pivoting guide 26 and the angular position of the arm 18 about the pivot axis "Y" thereof.

The transfer device 10 also has a second cam 34 that is arranged concentrically inside the first cam 32. The second cam 34 has a cam path 34A formed by the outer peripheral edge thereof. The cam path 34A of the second cam 34 is arranged parallel to and beneath the second cam path 32B of the first cam 32. The cam path 34A of the second cam 34 is designed to cooperate with the second cam follower 30B. Thus, the two cam paths 32B, 34A delimit a slot in which the second and third cam followers 30B, 30C are received to enable the controlled pivoting of the arm 18 about the axis "Y" in both pivoting directions.

When in use, the cam paths 32A, 32B, 34A are gradually clogged by projected lubricating grease mixed with polluting particles, such as plastic or metal particles. This layer of grime can have an abrasive effect on the cam followers 30A, 30B, 30C and cause the premature wear thereof.

To enable the quick and cheap cleaning of the cam paths 32A, 32B, 34A, the invention proposes that the conveyor wheel 12 carry at least one cleaning tool 36A, 36B, 36C designed to rub against the related cam path 32A, 32B, 34A. The tool 36A, 36B, 36C is mounted moveably and pressed against the related cam path 32A, 32B, 34A with enough force to enable automatic cleaning by contact, for example by rubbing, against the cam path 32A, 32B, 34A as the conveyor wheel 12 rotates.

In the embodiment shown in the figures, the transfer device 10 has three cam paths 32A, 32B, 34A. The invention proposes providing three cleaning tools 36A, 36B, 36C, each of which is associated with each cam path 32A, 32B, 34A.

Each tool 36A, 36B, 36C is carried by a slide 38 that is fastened to the conveyor wheel 12. The slide 38 extends globally radially in relation to the conveyor wheel 12. In the embodiment shown in FIGS. 3 and 4, the three tools 36A, 36B, 36C are carried by a shared slide 38.

In a variant of the invention not shown, the cleaning tools are carried by separate slides.

Each cleaning tool 36A, 36B, 36C is mounted on a carriage 40A, 40B that is mounted slidingly and radially on the slide 38. Each cleaning tool 36A, 36B, 36C is therefore mounted slidingly and globally radially in relation to the conveyor wheel 12.

In the embodiment shown in FIGS. 3 and 4, the cleaning tool 36A of the first outer cam path 32A of the first cam 32 is carried by a first related carriage 40A, while the cleaning tools 36B, 36C of the cam paths 32B, 34A that delimit the slot are both carried by the same second carriage 40B. The second carriage 40B is in this case received in the slot delimited by the two cam paths 32B, 34A.

Each cleaning tool 36A, 36B, 36C is carried removably on the slide 38, thereby enabling the cleaning tool to be replaced as required.

For example, it is possible to replace the tool 36A, 36B, 36C by replacing the entire related carriage 40A, 40B.

According to another example, each tool 36A, 36B, 36C is carried removably by the related carriage 40A, 40B. This makes it possible to replace the cleaning tool 36A, 36B, 36C of the related carriage 40A, 40B only, without removing the carriage 40A, 40B from the slide 38.

The cleaning tool 36A, 36B, 36C has a support 41 that carries a rubbing part, for example a scraper blade 43, that is designed to scrape the related cam path 32A, 32B, 34A as the conveyor wheel 12 rotates. The scraper blade 43 is for example made of rubber.

In a variant of the invention not shown, the scraper blade 43 is made of metal, for example steel, or of ceramic. In this case, the material is chosen to have a hardness less than the hardness of the related cam path to prevent the rubbing of the scraper blade 43 from damaging the cam path, for example causing scratches or removing chips of material.

In a variant of the invention not shown, the cleaning tool can also include a sponge that can be soaked in a cleaning product. The sponge is for example fed with a cleaning product through a pipe linked to a tank. The tank is for example carried by the slide.

The cleaning tool 36A associated with the outer cam path 32A is pressed against the outer cam path 32A by means of an elastic return member 42 pressing against the cam path 32A.

In the embodiment shown in FIGS. 3 and 4, the second carriage 40B is pressed radially into the slot by the two related scraper blades 43 bearing simultaneously and elastically against each cam path 32B, 34A. In other words, each blade 43 mounted on the second carriage 40B presses the other blade 43 against the related cam path 32B, 34A.

The elastic member 42 is in this case a helical spring, one end of which is fastened to the first carriage 40A and the other end of which is fastened to the second carriage 40B.

The slide 38 is in this case mounted on a dedicated seat on the conveyor wheel 12 between two adjacent transfer arms 18. The slide 38 is in this case fastened between two notches 14 using a fastening orifice 44. The slide 38 extends beneath the conveyor wheel 12.

The slide 38 is for example mounted on the conveyor wheel 12 during a maintenance operation of the transfer device 10, then removed when the transfer device 10 is being used to convey hollow articles.

If the slide 38 is liable to interfere with the movements of one of the adjacent transfer arms 18, said transfer arm 18 is removed.

In a variant of the invention not shown, the slide 38 is fastened removably in a notch 14 instead of a transfer arm 18.

According to a particularly advantageous variant, the slide 38 is mounted on the conveyor wheel 12 so as not to interfere with the transfer arms 18 or the hollow articles conveyed during one revolution of the conveyor wheel 12. This enables the cleaning tools 36A, 36B, 36C mounted on the conveyor wheel 12 to be left while the transfer device 10 is being used to convey the hollow articles. This ensures that the cam paths 32A, 32B, 34A are being cleaned constantly.

According to another variant of the invention not shown, the cleaning tool is mounted directly on an arm. In this case, the cleaning tool that is intended to clean a given cam path is carried by the same element as the related cam follower, for example the sliding rail or the pivoting guide. The cleaning tool is for example arranged upstream or downstream of the related cam follower in the direction of movement of the cam follower on the cam path.

The invention advantageously makes it possible to automate the cleaning operation of the cam paths by installing a cleaning tool on the conveyor wheel 12. Cleaning is thus performed automatically by rotating the conveyor wheel 12.

This helps to reduce the time required to clean the cam paths.

Furthermore, this makes it possible to perfectly and completely clean each cam path, even if certain portions are difficult to access for a human operator.

All of these advantages are obtained using a simple cleaning device that is in expensive to manufacture.

The invention claimed is:

1. A transfer device (10) for a hollow article comprising:
   a conveyor wheel (12) mounted in rotation about a central axis (X),
   transfer arms (18) that are mounted moveably on the conveyor wheel (12) and that are fitted with a gripping member (20) for a hollow article,
   at least one static cam (32, 34) comprising at least one cam path (32A, 32B, 34A) that cooperates with cam followers (30A, 30B, 30C) carried by the transfer arms (18) to control the position thereof,
   wherein the conveyor wheel (12) carries at least one cleaning tool (36A, 36B, 36C) for a related cam path (32A, 32B, 34A), the cleaning tool (36A, 36B, 36C) being mounted movably and pressed against the cam path (32A, 32B, 34A) with sufficient force to enable the automatic cleaning of the cam path (32A, 32B, 34A) as the conveyor wheel (12) rotates and in that the cleaning tool (36A, 36B, 36C) is carried by a slide (38) fastened to the conveyor wheel (12) that enables the cleaning tool (36A, 36B, 36C) to slide globally radially in relation to the conveyor wheel (12).

2. The device (10) as claimed in claim 1, wherein the cleaning tool (36A) is pressed against the cam path (32A) by means of an elastic return member (42) pressing against the cam path (32A).

3. The device (10) as claimed in claim 1, wherein the slide (38) is mounted on a dedicated seat on the conveyor wheel (12) between two adjacent transfer arms (18).

4. The device (10) as claimed in claim 1, wherein the slide (38) is fastened removably in place of a transfer arm (18).

5. The device (10) as claimed in claim 1, wherein the cleaning tool (36) is carried by an arm (18).

6. The device (10) as claimed in claim 5, wherein the device (10) has several cleaning tools (36A, 36B, 36C) carried by a single slide (38).

7. The device (10) as claimed in claim 1, wherein each cleaning tool (36A, 36B, 36C) is carried removably on the slide (38), thereby enabling the cleaning tool to be replaced as required.

8. The device (10) as claimed in claim 1, wherein the cleaning tool (36A, 36B, 36C) includes a scraper blade (43), notably a rubber blade or a steel blade or a ceramic blade.

9. The device (10) as claimed in claim 1, wherein the cleaning tool (36A, 36B, 36C) includes a sponge that can be soaked in a cleaning product.

10. The device (10) as claimed in claim 2, wherein the slide (38) is mounted on a dedicated seat on the conveyor wheel (12) between two adjacent transfer arms (18).

11. The device (10) as claimed in claim 2, wherein the slide (38) is fastened removably in place of a transfer arm (18).

12. The device (10) as claimed in claim 2, wherein the cleaning tool (36) is carried by an arm (18).

13. The device (10) as claimed in claim 2, wherein each cleaning tool (36A, 36B, 36C) is carried removably on the slide (38), thereby enabling the cleaning tool to be replaced as required.

14. The device (10) as claimed in claim 3, wherein each cleaning tool (36A, 36B, 36C) is carried removably on the slide (38), thereby enabling the cleaning tool to be replaced as required.

15. The device (10) as claimed in claim 4, wherein each cleaning tool (36A, 36B, 36C) is carried removably on the slide (38), thereby enabling the cleaning tool to be replaced as required.

16. The device (10) as claimed in claim 5, wherein each cleaning tool (36A, 36B, 36C) is carried removably on the slide (38), thereby enabling the cleaning tool to be replaced as required.

17. The device (10) as claimed in claim 2, wherein the cleaning tool (36A, 36B, 36C) includes a scraper blade (43), notably a rubber blade or a steel blade or a ceramic blade.

18. The device (10) as claimed in claim 3, wherein the cleaning tool (36A, 36B, 36C) includes a scraper blade (43), notably a rubber blade or a steel blade or a ceramic blade.

19. The device (10) as claimed in claim 2, wherein the cleaning tool (36A, 36B, 36C) includes a sponge that can be soaked in a cleaning product.

20. The device (10) as claimed in claim 3, wherein the cleaning tool (36A, 36B, 36C) includes a sponge that can be soaked in a cleaning product.

* * * * *